US011961492B2

(12) United States Patent
Wang et al.

(10) Patent No.: US 11,961,492 B2
(45) Date of Patent: Apr. 16, 2024

(54) LIQUID CRYSTAL DISPLAY PANEL COMPRISING PIXEL CIRCUIT REDUCING POWER CONSUMPTION

(71) Applicant: BOE Technology Group Co., Ltd., Beijing (CN)

(72) Inventors: Jiguo Wang, Beijing (CN); Jun Fan, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 276 days.

(21) Appl. No.: 17/264,331

(22) PCT Filed: Jul. 22, 2020

(86) PCT No.: PCT/CN2020/103627
§ 371 (c)(1),
(2) Date: Jan. 29, 2021

(87) PCT Pub. No.: WO2021/114671
PCT Pub. Date: Jun. 17, 2021

(65) Prior Publication Data
US 2022/0310031 A1 Sep. 29, 2022

(30) Foreign Application Priority Data
Dec. 13, 2019 (CN) ........................ 201911284712.X

(51) Int. Cl.
*G09G 3/36* (2006.01)

(52) U.S. Cl.
CPC ......... *G09G 3/3696* (2013.01); *G09G 3/3688* (2013.01); *G09G 2310/027* (2013.01)

(58) Field of Classification Search
CPC ...... G09G 3/36; G09G 3/3611; G09G 3/3614; G09G 3/3622; G09G 3/3625; G09G 3/364;
(Continued)

(56) References Cited

U.S. PATENT DOCUMENTS 8,237,653 B2 * 8/2012 Maeda ................... G09G 3/344 345/55
11,393,425 B2 * 7/2022 Wang ................... G09G 3/3696
(Continued)

FOREIGN PATENT DOCUMENTS

CN 102568395 A 7/2012
CN 106169288 A 11/2016
(Continued)

OTHER PUBLICATIONS

Chinese Office Action for corresponding 201911284712.X issued Jan. 28, 2021.

*Primary Examiner* — Ke Xiao
*Assistant Examiner* — Nelson Lam
(74) *Attorney, Agent, or Firm* — ArentFox Schiff LLP; Michael Fainberg

(57) ABSTRACT

A pixel circuit, a display panel, a display device and a driving method. The pixel circuit includes: a first control module, a latch module, a second control module, a first input module and a second input module. The first control module provides a signal on a data line to a first node under control of a signal of first gate line. The latch module latches signals of the first node and a second node. The second control module provides signal on the data line to a third node under control of a signal on a second gate line. The first input module provides a signal of a reference signal terminal to a pixel electrode under control of signal of the first node. The second input module provides a signal of the third node to the pixel electrode under control of signal of the second node.

15 Claims, 12 Drawing Sheets

(58) Field of Classification Search
CPC .. G09G 3/3648; G09G 3/3655; G09G 3/3659; G09G 3/3674; G09G 3/3677; G09G 3/3681; G09G 3/3685; G09G 3/3688; G09G 3/3692; G09G 3/3696
USPC .................................................... 345/87–104
See application file for complete search history.

(56) References Cited

U.S. PATENT DOCUMENTS

| | | | | |
|---|---|---|---|---|
| 11,615,759 | B2 * | 3/2023 | Wang | G09G 3/3648 345/212 |
| 2002/0153843 | A1 * | 10/2002 | Senda | G09G 3/3648 315/169.3 |
| 2003/0210219 | A1 | 11/2003 | Osame | |
| 2004/0095305 | A1 * | 5/2004 | Kimura | G09G 3/20 345/92 |
| 2004/0164944 | A1 * | 8/2004 | Miyazawa | G09G 3/3659 345/98 |
| 2005/0012726 | A1 * | 1/2005 | Fujikawa | G09G 3/3648 345/204 |
| 2006/0221033 | A1 * | 10/2006 | Yasuda | G09G 3/3648 345/92 |
| 2006/0232535 | A1 * | 10/2006 | Toyozawa | G09G 3/3677 345/90 |
| 2007/0052657 | A1 * | 3/2007 | Ozawa | G09G 3/3659 345/100 |
| 2008/0088552 | A1 * | 4/2008 | Toya | G09G 3/3688 345/84 |
| 2008/0238850 | A1 * | 10/2008 | Watanabe | G09G 3/3614 345/90 |
| 2008/0238855 | A1 * | 10/2008 | Teranishi | G09G 3/2011 345/98 |
| 2010/0149080 | A1 * | 6/2010 | Teranishi | G02F 1/136213 345/87 |
| 2012/0154416 | A1 | 6/2012 | Nakanishi et al. | |
| 2013/0241974 | A1 * | 9/2013 | Teranishi | G09G 3/2081 345/87 |
| 2015/0262523 | A1 | 9/2015 | Teranishi et al. | |
| 2018/0218706 | A1 | 8/2018 | Gong | |
| 2019/0279587 | A1 * | 9/2019 | Nakao | G09G 3/3406 |
| 2020/0020295 | A1 | 1/2020 | Han et al. | |
| 2020/0160769 | A1 | 5/2020 | Fu et al. | |
| 2020/0160806 | A1 | 5/2020 | Guo et al. | |
| 2020/0410920 | A1 | 12/2020 | Chen et al. | |

FOREIGN PATENT DOCUMENTS

| | | | |
|---|---|---|---|
| CN | 107767809 | A | 3/2018 |
| CN | 108877711 | A | 11/2018 |
| CN | 108922483 | A | 11/2018 |
| CN | 109272962 | A | 1/2019 |
| CN | 109545137 | A | 3/2019 |
| CN | 110930928 | A | 3/2020 |

* cited by examiner

LIQUID CRYSTAL DISPLAY PANEL COMPRISING PIXEL CIRCUIT REDUCING POWER CONSUMPTION

CROSS-REFERENCE TO RELATED APPLICATIONS

The present disclosure is a National Stage of International Application No. PCT/CN2020/103627, filed on Jul. 22, 2020, which claims priority to the Chinese Patent Application No. 201911284712.X, filed on Dec. 13, 2019 to the Patent Office of the People's Republic of China and entitled "Pixel Circuit, Display Panel, Display Device and Driving Method", the entire content of which is incorporated herein by reference.

FIELD

The present disclosure relates to the technical field of display, and in particular to a pixel circuit, a display panel, a display device and a driving method.

BACKGROUND

Generally, the display panel is in a standby state for a long time during use. Since there is no user using it during standby, it does not need to display colorful pictures or need the same power consumption as in normal display.

SUMMARY

An embodiment of the present disclosure provides a pixel circuit, including: a first control module, a latch module, a second control module, a first input module and a second input module; wherein the first control module is configured to provide a signal on a data line to a first node under a control of a signal on a first gate line;

the latch module is configured to latch signals of the first node and a second node;

the second control module is configured to provide the signal on the data line to a third node under a control of a signal on a second gate line;

the first input module is configured to provide a signal of a reference signal terminal to a pixel electrode under a control of the signal of the first node; and the second input module is configured to provide a signal of the third node to the pixel electrode under a control of the signal of the second node.

Optionally, in some embodiments of the present disclosure, a control terminal of the second control module is electrically connected to the second gate line, an input terminal of the second control module is electrically connected to the data line, and an output terminal of the second control module is electrically connected to the third node.

Optionally, in some embodiments of the present disclosure, the second control module includes: a first transistor; wherein a gate of the first transistor is electrically connected to the second gate line, a first electrode of the first transistor is electrically connected to the data line, and a second electrode of the first transistor is electrically connected to the third node.

Optionally, in some embodiments of the present disclosure, the first input module includes a seventh transistor, wherein a gate of the seventh transistor is electrically connected to the first node, a first electrode of the seventh transistor is electrically connected to the reference signal terminal, and a second electrode of the seventh transistor is electrically connected to the pixel electrode; and the second input module includes: an eighth transistor, wherein a gate of the eighth transistor is electrically connected to the second node, a first electrode of the eighth transistor is electrically connected to the third node, and a second electrode of the eighth transistor is electrically connected to the pixel electrode.

Optionally, in some embodiments of the present disclosure, the first control module includes: a second transistor, wherein a gate of the second transistor is electrically connected to the first gate line, a first electrode of the second transistor is electrically connected to the data line, and a second electrode of the second transistor is electrically connected to the first node;

the latch module includes: a third transistor, a fourth transistor, a fifth transistor and a sixth transistor;

a gate of the third transistor is electrically connected to the first node, a first electrode of the third transistor is electrically connected to a first voltage terminal, and a second electrode of the third transistor is electrically connected to the second node;

a gate of the fourth transistor is electrically connected to the first node, a first electrode of the fourth transistor is electrically connected to a second voltage terminal, and a second electrode of the fourth transistor is electrically connected to the second node;

a gate of the fifth transistor is electrically connected to the second node, a first electrode of the fifth transistor is electrically connected to the first voltage terminal, and a second electrode of the fifth transistor is electrically connected to the first node; and a gate of the sixth transistor is electrically connected to the second node, a first electrode of the sixth transistor is electrically connected to the second voltage terminal, and a second electrode of the sixth transistor is electrically connected to the first node.

An embodiment of the present disclosure further provides a display panel, including: a plurality of first gate lines, a plurality of second gate lines, a plurality of data lines and a plurality of pixel cells arranged in an array; wherein each of the pixel cells includes a plurality of sub-pixels, and each of the sub-pixels includes the above-mentioned pixel circuit and a pixel electrode; wherein one row of the sub-pixels correspond to one of the first gate lines and one of the second gate lines, and one column of the sub-pixels correspond to one of the data lines.

Optionally, in some embodiments of the present disclosure, the display panel further includes: a first gate drive circuit and a second gate drive circuit;

the first gate drive circuit is electrically connected to the first gate lines; and the second gate drive circuit is electrically connected to the second gate lines.

An embodiment of the present disclosure further provides a display device, including the above-mentioned display panel.

An embodiment of the present disclosure further provides a method for driving the above-mentioned pixel circuit, including: a first driving mode and a second driving mode; wherein in the first driving mode, a first level signal is loaded to the second gate line, a gate scanning signal is loaded to the first gate line, a data signal is loaded to the data line, and a first reference signal is loaded to the reference signal terminal;

a second level signal is loaded to the second gate line, the first level signal is loaded to the first gate line, a second reference signal is loaded to the data line, and the first reference signal is loaded to the reference signal terminal;

in the second driving mode, the second level signal is loaded to the first gate line, the first level signal is loaded to the second gate line, the first level signal is loaded to the data line, and the first reference signal is loaded to the reference signal terminal; and the first level signal is loaded to the first gate line, the gate scanning signal is loaded to the second gate line, the data signal is loaded to the data line, and the first reference signal is loaded to the reference signal terminal.

An embodiment of the present disclosure further provides a method for driving the above-mentioned display panel, including:

in a first driving mode, driving the display panel to use a first color depth for display; and in a second driving mode, driving the display panel to use a second color depth for display; wherein the driving the display panel to use the first color depth for display includes:

loading a first level signal to each of the second gate lines, loading a gate scanning signal to the first gate lines line by line, loading a data signal to each of the data lines, and loading a first reference signal to the reference signal terminal; and loading a second level signal to the second gate lines, loading the first level signal to the first gate lines, loading a second reference signal to the data lines, and loading the first reference signal to the reference signal terminal;

the driving the display panel to use the second color depth for display includes:

loading the second level signal to the first gate lines, loading the first level signal to the second gate lines, loading the first level signal to the data lines, and loading the first reference signal to the reference signal terminal; and loading the first level signal to the first gate lines, loading the gate scanning signal to the second gate lines line by line, loading the data signal to the data lines, and loading the first reference signal to the reference signal terminal.

Optionally, in the embodiment of the present disclosure, a voltage of the first reference signal is a data voltage corresponding to a zero gray level, and a voltage of the second reference signal is a data voltage corresponding to a highest gray level.

DETAILED DESCRIPTION OF THE EMBODIMENTS

Figure 1:
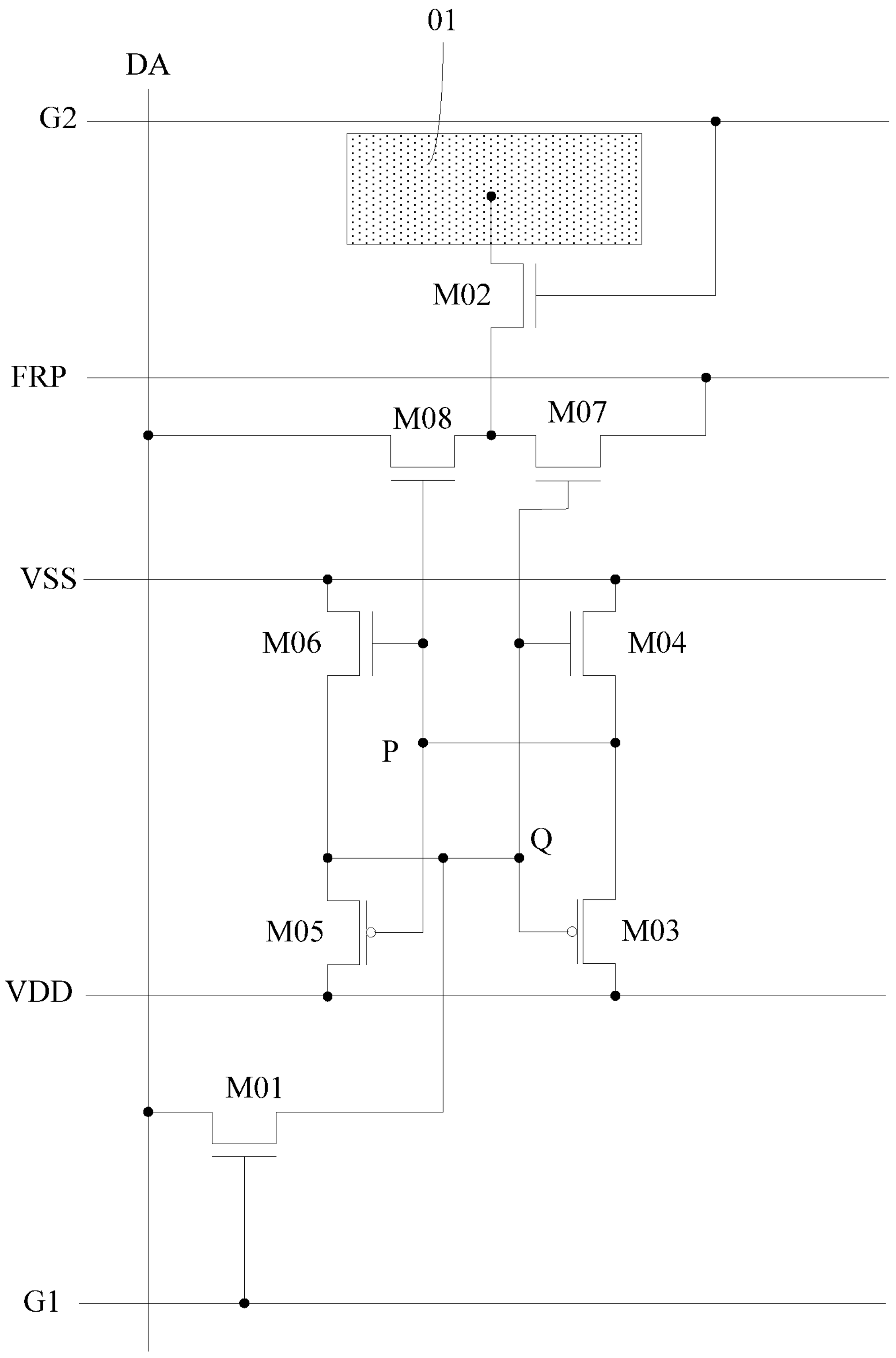
FIG. 1 is a schematic structural diagram of a pixel circuit in the related art.

To make the objectives, technical solutions and advantages of embodiments of the present disclosure more clear, the technical solutions of embodiments of the present disclosure will be described clearly and completely in conjunction with the accompanying drawings of embodiments of the present disclosure. Obviously, the described embodiments are a part of embodiments of the present disclosure, but not all embodiments. In the case of no conflict, some embodiments in the present disclosure and the features in some embodiments may be combined with each other. Based on the described embodiments of the present disclosure, all other embodiments obtained by those of ordinary skill in the art without creative work are within the protection scope of the present disclosure.

Unless otherwise defined, the technical terms or scientific terms used in the present disclosure shall have the ordinary meanings understood by those of ordinary skill in the art to which the present disclosure belongs. The terms "first", "second" and similar words used in the present disclosure do not indicate any order, quantity or importance, but are only used to distinguish different components. Similar words such as "comprise" or "include" or the like mean that the elements or objects appearing before the word cover the elements or objects listed after the word and their equivalents, but do not exclude other elements or objects. Similar words such as "connected to" or "connected with" are not limited to physical or mechanical connections, but may include electrical connections, whether direct or indirect.

It should be noted that the shape and size of each graph in the accompanying drawings do not reflect the true scale, and are merely intended to illustrate the contents of the present disclosure. The same or similar reference numerals indicate the same or similar elements or elements having the same or similar functions throughout.

As shown in FIG. 1, a pixel circuit may include: transistors M01-M08. In actual application, firstly, when a signal on a gate line G2 is a low-level signal, the transistor M02 is turned off. When a signal on a gate line G1 is a high-level signal, the transistor M01 is turned on, and a signal on a data line DA is a high-level signal, so that a signal of a node Q is a high-level signal, thereby controlling the transistors M04 and M07 to be turned on and controlling the transistor M03 to be turned off. The turned-on transistor M04 provides a low-level signal on a signal line VSS to a node P to control the transistor M05 to be turned on and control the transistors M06 and M08 to be turned off. The turned-on transistor M05 may provide a high-level signal of a signal line VDD to the node Q. Thus, the transistors M04-M06 can latch the signals of the node Q and the node P. Then, when the signal on the gate line G1 is a low-level signal, the transistor M01 is turned off. The transistors M04-M06 latch the signals of the node Q and the node P. The signal on the gate line G2 is a gate scanning signal, and the transistor M02 is turned on under the control of the gate scanning signal, and, in combination with the transistor M07, can provide a black picture data signal on a signal line FRP to a pixel electrode 01, so that a sub-pixel where the pixel electrode 01 is located displays black. At the moment, the current flow path for charging the pixel electrode 01 is: signal line FRP→transistor M07→transistor M02→pixel electrode 01. Thus, the power consumption of the flow path for charging the pixel electrode 01 is high, which is not conducive to saving power consumption of the display panel.

Figure 2A:
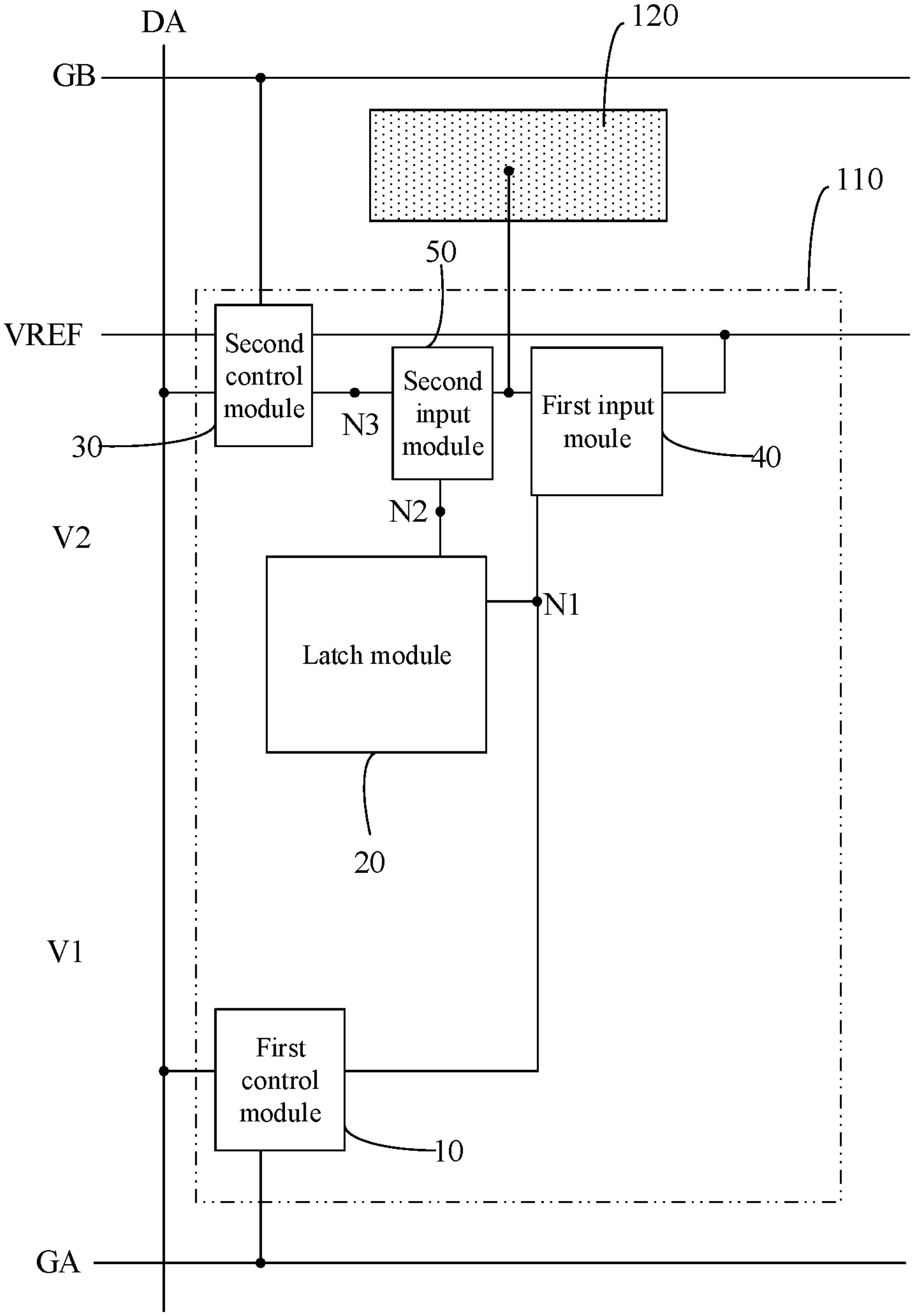
FIG. 2A is a schematic structural diagram of a pixel circuit in an embodiment of the present disclosure.

An embodiment of the present disclosure provides a pixel circuit 110, as shown in FIG. 2A, which may include: a first control module 10, a latch module 20, a second control module 30, a first input module 40 and a second input module 50.

The first control module 10 is configured to provide a signal on a data line DA to a first node N1 under the control of a signal on a first gate line GA.

The latch module 20 is configured to latch signals of the first node N1 and a second node N2.

The second control module 30 is configured to provide the signal on the data line DA to a third node N3 under the control of a signal on a second gate line GB.

The first input module 40 is configured to provide a signal of a reference signal terminal VREF to a pixel electrode 120 under the control of the signal of the first node N1.

The second input module 50 is configured to provide a signal of the third node N3 to the pixel electrode 120 under the control of the signal of the second node N2.

The pixel circuit provided by some embodiments of the present disclosure includes: a first control module, a latch module, a second control module, a first input module and a second input module. The first control module can provide a signal on a corresponding data line to a first node under the control of a signal on a corresponding first gate line. The latch module can latch signals of the first node and a second node. The second control module can provide the signal on the data line to a third node under the control of a signal on a corresponding second gate line. The first input module can provide a signal of a reference signal terminal to a pixel electrode under the control of the signal of the first node. The second input module can provide a signal of the third node to the pixel electrode under the control of the signal of the second node. Thus, through the cooperation of the first control module, the latch module, the second control module, the first input module and the second input module, the power consumption of the flow path for charging the pixel electrode can be reduced.

It should be noted that when the above-mentioned pixel circuit is applied to a display panel, if the display panel adopts a lower refresh frequency (for example, 1 Hz), the advantage of reducing power consumption is more obvious, and the core competitiveness of a product is further enhanced.

Figure 2B:
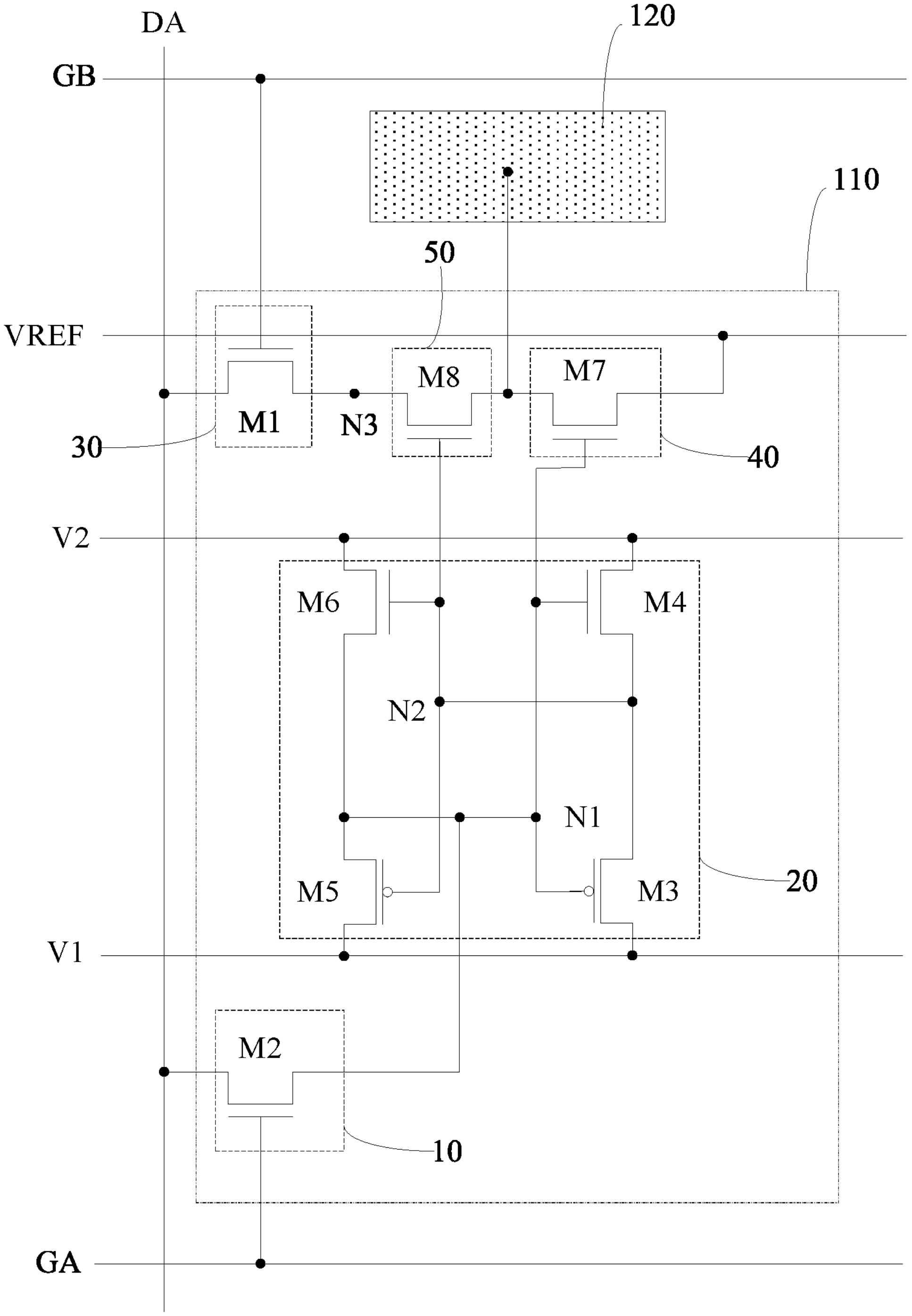
FIG. 2B is a specific schematic structural diagram of a pixel circuit in an embodiment of the present disclosure.

In an embodiment of the present disclosure, as shown in FIG. 2A and FIG. 2B, a control terminal of the second control module 30 is electrically connected to the second gate line GB, an input terminal of the second control module 30 is electrically connected to the data line DA, and an output terminal of the second control module 30 is electrically connected to the third node N3.

In some embodiments of the present disclosure, as shown in FIG. 2B, the second control module 30 may include: a first transistor M1, wherein a gate of the first transistor M1 is electrically connected to the second gate line GB, a first electrode of the first transistor M1 is electrically connected to the data line DA, and a second electrode of the first transistor M1 is electrically connected to the third node N3.

Exemplarily, the first transistor M1 may be an N-type transistor. Of course, the first transistor M1 may also be a P-type transistor, which is not limited herein.

In some embodiments of the present disclosure, when the first transistor M1 is in an on state under the control of the signal transmitted on the second gate line GB, the signal transmitted on the data lines DA may be provided to the third node N3.

In some embodiments of the present disclosure, as shown in FIG. 2B, the first control module 10 may include: a second transistor M2, wherein a gate of the second transistor M2 is electrically connected to the first gate line GA, a first electrode of the second transistor M2 is electrically connected to the data line DA, and a second electrode of the second transistor M2 is electrically connected to the first node N1.

Exemplarily, the second transistor M2 may be an N-type transistor. Of course, the second transistor M2 may also be a P-type transistor, which is not limited herein.

In some embodiments of the present disclosure, when the second transistor M2 is in the on state under the control of the signal transmitted on the first gate line GA, the signal transmitted on the data line DA may be provided to the first node N1.

In some embodiments of the present disclosure, as shown in FIG. 2B, the latch module 20 includes: a third transistor M3, a fourth transistor M4, a fifth transistor M5 and a sixth transistor M6.

A gate of the third transistor M3 is electrically connected to the first node N1, a first electrode of the third transistor M3 is electrically connected to a first voltage terminal V1, and a second electrode of the third transistor M3 is electrically connected to the second node N2.

Agate of the fourth transistor M4 is electrically connected to the first node N1, a first electrode of the fourth transistor M4 is electrically connected to a second voltage terminal V2, and a second electrode of the fourth transistor M4 is electrically connected to the second node N2.

Agate of the fifth transistor M5 is electrically connected to the second node N2, a first electrode of the fifth transistor M5 is electrically connected to the first voltage terminal V1, and a second electrode of the fifth transistor M5 is electrically connected to the first node N1.

A gate of the sixth transistor M6 is electrically connected to the second node N2, a first electrode of the sixth transistor M6 is electrically connected to the second voltage terminal V2, and a second electrode of the sixth transistor M6 is electrically connected to the first node N1.

In some embodiments of the present disclosure, the signal of the first voltage terminal V1 is a low-voltage signal, and the signal of the second voltage terminal V2 is a high-voltage signal. Of course, in actual application, specific voltage values of the first voltage terminal V1 and the second voltage terminal V2 can be designed and determined according to the actual application environment, which is not limited herein.

In some embodiments of the present disclosure, when the third transistor M3 is in the on state under the control of the signal of the first node N1, the signal of the first voltage terminal V1 may be provided to the second node N2. When the fourth transistor M4 is in the on state under the control of the signal of the first node N1, the signal of the second voltage terminal V2 may be provided to the second node N2. When the fifth transistor M5 is in the on state under the control of the signal of the second node N2, the signal of the first voltage terminal V1 may be provided to the first node N1. When the sixth transistor M6 is in the on state under the control of the signal of the second node N2, the signal of the second voltage terminal V2 may be provided to the first node N1.

Exemplarily, the fifth transistor M5 and the sixth transistor M6 may be N-type transistors. Of course, the fifth transistor M5 and the sixth transistor M6 may also be P-type transistors, which is not limited herein.

Exemplarily, the third transistor M3 and the fourth transistor M4 may be P-type transistors. Of course, the third transistor M3 and the fourth transistor M4 may also be N-type transistors, which is not limited herein.

In some embodiments of the present disclosure, as shown in FIG. 2B, the first input module 40 may include: a seventh transistor M7, wherein a gate of the seventh transistor M7 is electrically connected to the first node N1, a first electrode of the seventh transistor M7 is electrically connected to the reference signal terminal VREF, and a second electrode of the seventh transistor M7 is electrically connected to the pixel electrode 120.

Exemplarily, the seventh transistor M7 may be an N-type transistor. Of course, the seventh transistor M7 may also be a P-type transistor, which is not limited herein.

In some embodiments of the present disclosure, when the seventh transistor M7 is in the on state under the control of the signal of the first node N1, the signal of the reference signal terminal VREF may be provided to the pixel electrode 120.

In some embodiments of the present disclosure, as shown in FIG. 2B, the second input module 50 may include: an eighth transistor M8, wherein a gate of the eighth transistor M8 is electrically connected to the second node N2, a first electrode of the eighth transistor M8 is electrically connected to the third node N3, and a second electrode of the eighth transistor M8 is electrically connected to the pixel electrode 120.

Exemplarily, the eighth transistor M8 may be an N-type transistor. Of course, the eighth transistor M8 may also be a P-type transistor, which is not limited herein.

In some embodiments of the present disclosure, when the eighth transistor M8 is in the on state under the control of the signal of the second node N2, the signal of the third node N3 may be provided to the pixel electrode 120.

Figure 3:
FIG. 3 is a schematic structural diagram of a gate scanning signal in an embodiment of the present disclosure.

In some embodiments of the present disclosure, a gate scanning signal ga as shown in FIG. 3 can be transmitted on the first gate line GA and the second gate line GB. Exemplarily, when the gate scanning signal ga is at a high level, the second transistor M2 and the first transistor M1 may be controlled to be turned on. At the moment, the second transistor M2 and the first transistor M1 are set as N-type transistors. When the gate scanning signal ga is at a low level, the second transistor M2 and the first transistor M1 may be controlled to be turned off. At the moment, the second transistor M2 and the first transistor M1 are set as P-type transistors. Of course, the specific implementation manner of the gate scanning signal ga can be designed and determined according to the actual application environment, which is not limited herein.

The above only exemplifies a specific structure of each of modules in the pixel circuit provided by some embodiments of the present disclosure. In specific implementation, the specific structure of each of the above modules is not limited to the above structure provided by some embodiments of the present disclosure, and may also be other structures known to those skilled in the art, which is not limited herein.

In an embodiment of the present disclosure, the P-type transistor is turned on under the action of a low-level signal and turned off under the action of a high-level signal. The N-type transistor is turned on under the action of a high-level signal and turned off under the action of a low-level signal.

In an embodiment of the present disclosure, the above-mentioned transistors may be thin film transistors (TFTs) or metal oxide semiconductor (MOS) field-effect transistors, which is not limited herein. Besides, according to the different types of the transistors and the different signals of the gates of the transistors described above, the first terminal of the above-mentioned transistor may be used as a source and the second terminal of the transistor may be used as a drain, or the first terminal of the transistor may be used as a drain and the second terminal of the transistor may be used as a source, which is not specifically distinguished herein.

Based on the same inventive concept, an embodiment of the present disclosure further provides a driving method of a pixel circuit, including: a first driving mode and a second driving mode.

Figure 4A:
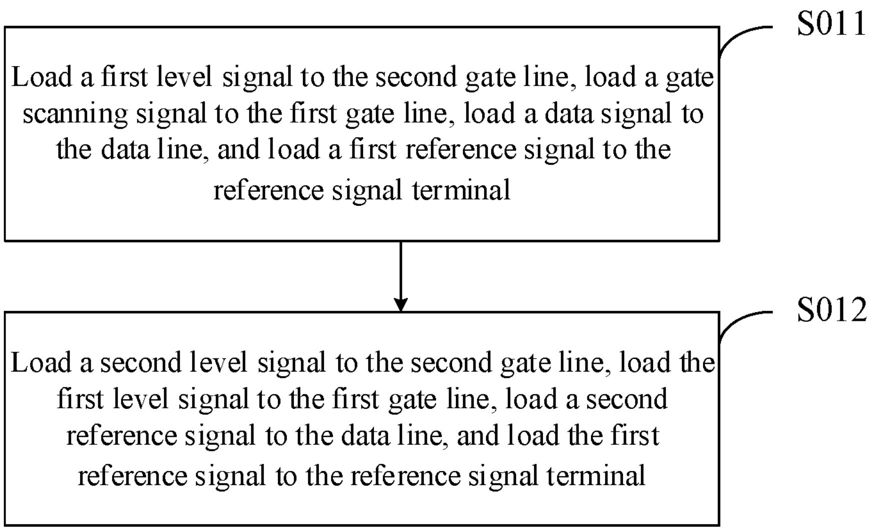
FIG. 4A is a flowchart of a driving method of a pixel circuit in an embodiment of the present disclosure.

Exemplarily, as shown in FIG. 4A, in the first driving mode, the method may include the following steps.

S011, loading a first level signal to the second gate line, loading a gate scanning signal to the first gate line, loading a data signal to the data line, and loading a first reference signal to the reference signal terminal.

S012, loading a second level signal to the second gate line, loading the first level signal to the first gate line, loading a second reference signal to the data line, and loading the first reference signal to the reference signal terminal.

Figure 4B:
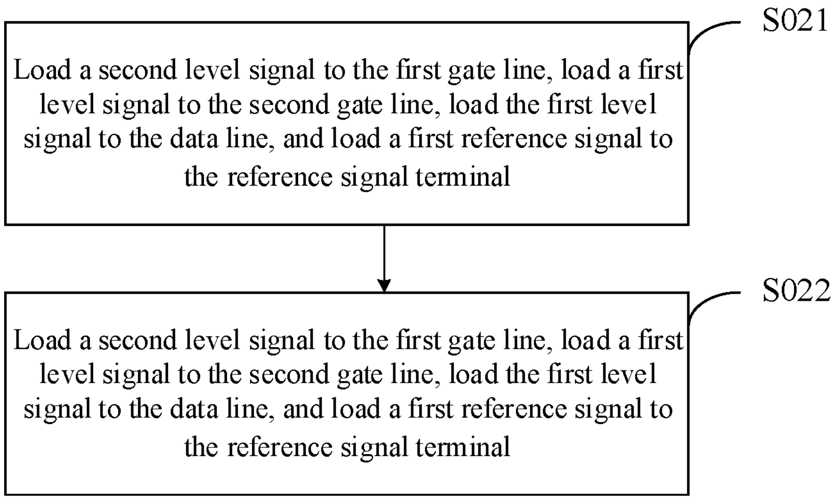
FIG. 4B is a flowchart of a driving method of another pixel circuit in an embodiment of the present disclosure.

Exemplarily, as shown in FIG. 4B, in the second driving mode, the method may include the following steps.

S021, loading the second level signal to the first gate line, loading the first level signal to the second gate line, loading the first level signal to the data line, and loading the first reference signal to the reference signal terminal.

S022, loading the first level signal to the first gate line, loading the gate scanning signal to the second gate line, loading the data signal to the data line, and loading the first reference signal to the reference signal terminal.

Exemplarily, the first level signal may be a low-level signal, and the second level signal may be a high-level signal. Of course, the first level signal may also be a high-level signal, and the second level signal may also be a low-level signal, which is not limited herein. In actual application, the specific implementation manners of the first level and the second level can be set according to whether the transistor in the pixel circuit is an N-type transistor or a P-type transistor, which is not limited herein.

A gray scale generally divides a brightness change area between the brightest and the darkest into several parts to facilitate screen brightness control. For example, a displayed image can generally be composed of three colors, red, green and blue, which are mixed to form a color image. Each color can have different brightness levels, and different brightness levels of red, green, and blue can be combined to form different color points. The gray scale represents the level of different brightness from the darkest to the brightest. The more intermediate levels there are, the more delicate the picture effect can be. At present, a general display device may use a 6-bit (2 to the 6th power of brightness levels, that is, 64 gray levels) panel, a 7-bit (2 to the 7th power of brightness levels, that is, 128 gray levels) panel, a 8-bit (2 to the 8th power of brightness levels, that is, 256 gray levels) panel, 10-bit (2 to the 10th power of brightness levels, that is, 1,024 gray levels) panel, 12-bit (2 to the 12th power of brightness levels, that is, 4,096 gray levels) panel or a 16-bit (2 to the 16th power of brightness levels, that is, 65,536 gray levels) panel to realize image display.

In some embodiments of the present disclosure, a voltage of the first reference signal may be a data voltage corresponding to a zero gray level, and a voltage of the second reference signal may be a data voltage corresponding to a highest gray level. Exemplarily, taking a 256-gray-level panel as an example, the voltage of the first reference signal is a data voltage corresponding to a zero gray level, and the voltage of the second reference signal is a data voltage corresponding to a gray level 255. Taking a 64-gray-level panel as an example, the voltage of the first reference signal is a data voltage corresponding to a zero gray level, and the voltage of the second reference signal is a data voltage corresponding to a gray level 63.

Taking the structure shown in FIG. 2B as an example, in conjunction with the circuit timing diagrams shown in FIG. 5A and FIG. 5B, the working process of the pixel circuit provided by some embodiments of the present disclosure will be described below, wherein ga-GB represents a signal transmitted on the second gate line GB, and ga-GA represents a signal transmitted on the first gate line GA.

Figure 5A:
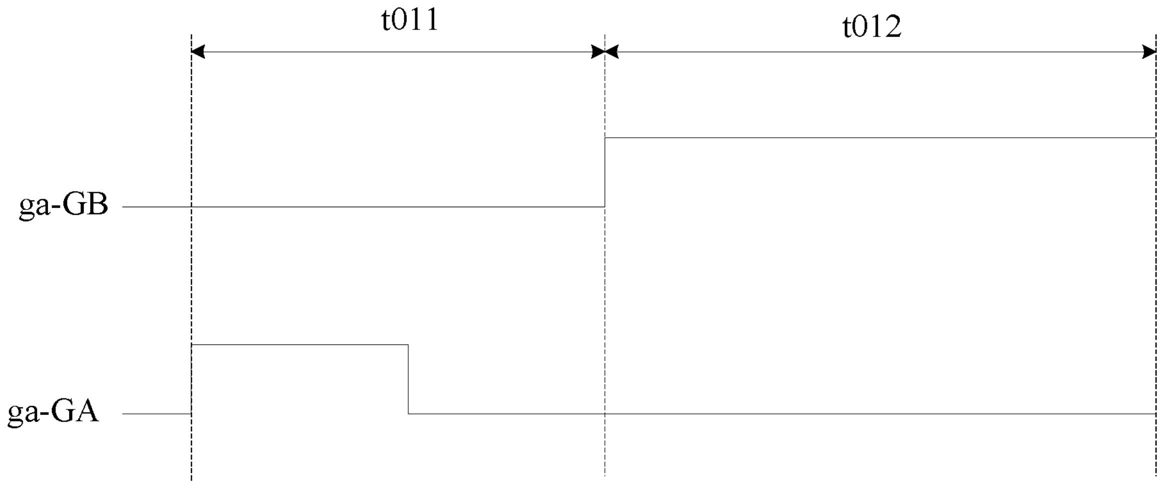
FIG. 5A is a circuit timing diagram of a pixel circuit in an embodiment of the present disclosure.

As shown in FIG. 5A, one frame time has a t011 stage and a t012 stage. The working process of the step S011 can be realized in the t011 stage, and the working process of the step S012 can be realized in the t012 stage.

In the t011 stage, since the signal ga-GB is a low-level signal, the first transistor M1 is turned off. Since the signal ga-GA is a high-level signal, the second transistor M2 is turned on, so that the data signal transmitted on the data line DA is provided to the first node N1. Moreover, the signals of the first node N1 and the second node N2 are latched by a latch composed of the third transistor M3 to the sixth transistor M6.

In the t012 stage, since the signal ga-GA is a low-level signal, the second transistor M2 is turned off. Therefore, the signals of the first node N1 and the second node N2 are latched by the latch composed of the third transistor M3 to the sixth transistor M6. Since the signal ga-GB is a high-level signal, the first transistor M1 is turned on. Moreover, the data voltage corresponding to the highest gray level is loaded to the data line DA. Then, since the signal ga-GB is a low-level signal, the first transistor M1 is turned off. Besides, the signals of the first node N1 and the second node N2 are latched by the latch composed of the third transistor M3 to the sixth transistor M6.

If the data signal in the t011 stage is set to a high-level signal (for example, the signal of the data voltage corresponding to the highest gray level), the signal of the first node N1 is a high-level signal, and under the latching action of the third transistor M3 to the sixth transistor M6, the signal of the first node N1 may be latched as a high-level signal and the signal of the second node N2 may be latched as a low-level signal. Therefore, the seventh transistor M7 may be turned on, and the eighth transistor M8 may be turned off. Then in the t012 stage, the turned-on seventh transistor M7 may provide the data voltage corresponding to the zero gray level of the reference signal terminal VREF to the pixel electrode 120, so that the data voltage corresponding to the zero gray level is input to the pixel electrode 120.

If the data signal in the t011 stage is set to a low-level signal, the signal of the first node N1 may be a low-level signal, and under the latching action of the third transistor M3 to the sixth transistor M6, the signal of the second node N2 may be latched as a high-level signal and the signal of the first node N1 may be latched as a low-level signal. Therefore, the seventh transistor M7 may be turned off, and the eighth transistor M8 may be turned on. The turned-on eighth transistor M8 may connect the third node N3 with the pixel electrode 120. Then, in the t012 stage, the data voltage corresponding to the highest gray level loaded by the data line DA may be provided to the pixel electrode 120 through the eighth transistor M8 and the first transistor M1 that are turned on, so that the data voltage corresponding to the highest gray level is input to the pixel electrode 120.

Moreover, in an embodiment of the present disclosure, when the data voltage corresponding to the zero gray level is input to the pixel electrode, a current flow path may be: reference signal terminal VREF→seventh transistor M7→pixel electrode 120. Thus, compared with the current flow path for charging the pixel electrode 01: signal line FRP→transistor M07→transistor M02→pixel electrode 01, the current flow path has the feature that the power consumption of at least one transistor can be saved. Especially, when the above-mentioned pixel circuit is applied to a display panel, if the display panel adopts a lower refresh frequency (for example, 1 Hz), the advantage of reducing power consumption can be more obvious, and the core competitiveness of the product is further enhanced.

Figure 5B:
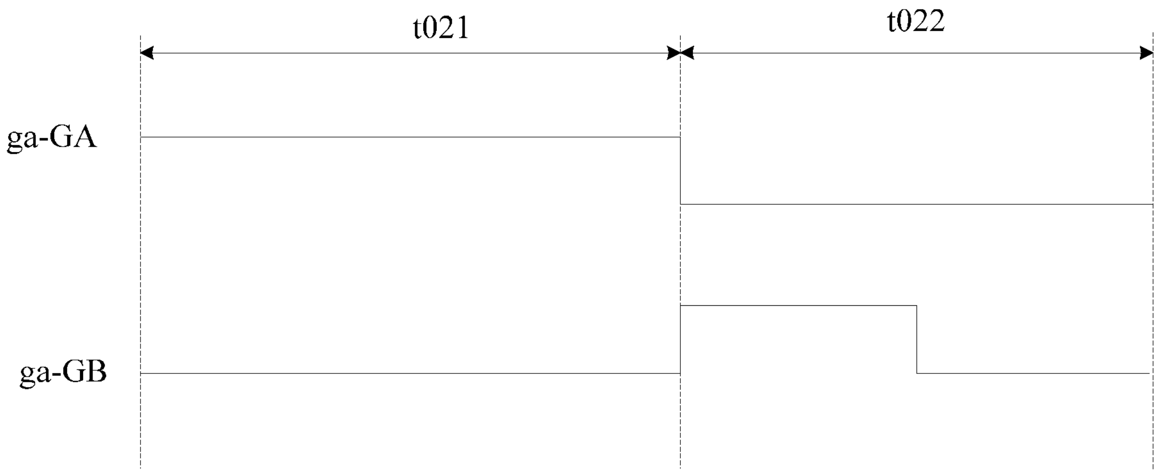
FIG. 5B is a circuit timing diagram of another pixel circuit in an embodiment of the present disclosure.

As shown in FIG. 5B, one frame time has a t021 stage and a t022 stage. The working process of the step S021 can be realized in the t021 stage, and the working process of the step S022 can be realized in the t022 stage.

In the t021 stage, since the signal ga-GB is a low-level signal, the first transistor M1 is turned off. Since the signal ga-GA is a high-level signal, the second transistor M2 is turned on. A low-level signal is loaded to the data line DA, and then input to the first node N1 through the turned-on second transistor M2, so that the signal of the first node N1 is a low-level signal. Under the latching action of the third transistor M3 to the sixth transistor M6, the signal of the second node N2 may be latched as a high-level signal and the signal of the first node N1 may be latched as a low-level signal. Therefore, the seventh transistor M7 is turned off, and the eighth transistor M8 is turned on. The turned-on eighth transistor M8 may connect the third node N3 with the pixel electrode 120. However, since the first transistor M1 is not turned on, the voltage on the data line DA is not input to the pixel electrode 120.

In the t022 stage, under the latching action of the third transistor M3 to the sixth transistor M6, the signal of the second node N2 may be latched as a high-level signal and the signal of the first node N1 may be latched as a low-level signal. Therefore, the seventh transistor M7 may be turned off, and the eighth transistor M8 may be turned on. Since the signal ga-GA is a low-level signal, the second transistor M2 is turned off. Since the signal ga-GB is a high-level signal, the first transistor M1 is turned on, so that the data signal transmitted on the data line DA is provided to the pixel electrode 120 through the first transistor M1 and the eighth transistor M8 that are turned on. If the voltage of the data signal can correspond to the data voltage of the gray level 64, then a sub-pixel where the pixel electrode 120 is located can realize the brightness of 64 gray levels.

In summary, in some embodiments of the present disclosure, the sub-pixel where the pixel circuit is located can realize the brightness of multiple gray levels, and when the data voltage corresponding to the zero gray level is input to the pixel electrode, a current flow path may be: reference signal terminal VREF→seventh transistor M7→pixel electrode 120. Thus, compared with the current flow path for charging the pixel electrode 01: signal line FRP→transistor M07→transistor M02→pixel electrode 01, the current flow path has the feature that the power consumption of at least one transistor can be saved. Especially when the above-mentioned pixel circuit is applied to a display panel, if the display panel adopts a lower refresh frequency (for example, 1 Hz), the advantage of reducing power consumption is more obvious, and the core competitiveness of the product is further enhanced.

Figure 6A:
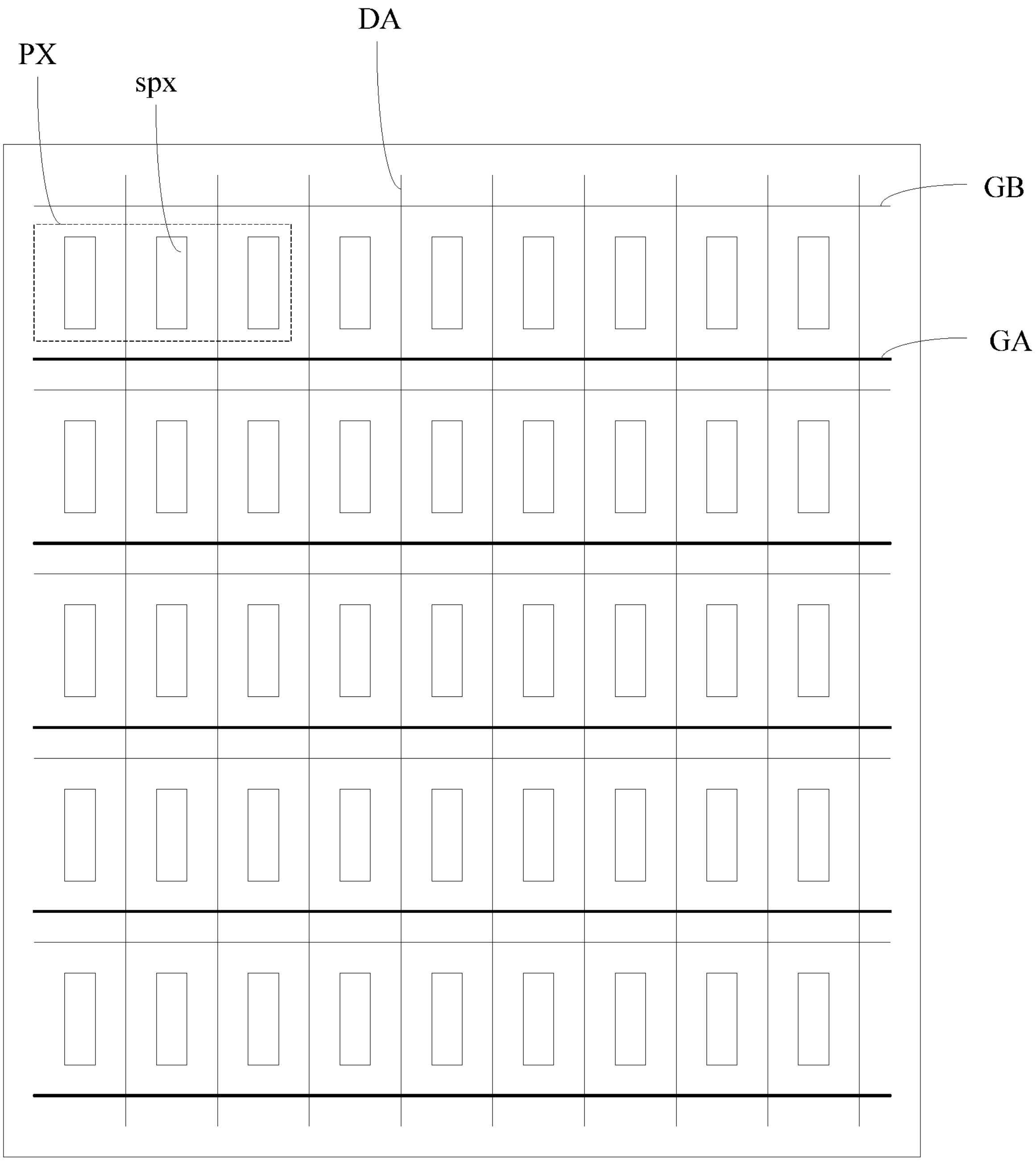
FIG. 6A is a schematic structural diagram of a display panel in an embodiment of the present disclosure.

Based on the same inventive concept, an embodiment of the present disclosure further provides a display panel, as shown in FIG. 6A, which may include: a plurality of first gate lines GA, a plurality of second gate lines GB, a plurality of data lines DA and a plurality of pixel cells PX. Each of the pixel cells includes a plurality of sub-pixels spx, and each of the sub-pixels spx includes a pixel circuit 110 and a pixel electrode 120. One row of the sub-pixels spx correspond to one of the first gate lines GA and one of the second gate lines GB, and one column of the sub-pixels spx correspond to one of the data lines DA.

It should be noted that, a pixel circuit 110 is the above-mentioned pixel circuit 110 provided by some embodiments of the present disclosure. Besides, for the specific structure and working process of the pixel circuit 110, reference can be made to the above-mentioned embodiments, and details will not be repeated herein.

In some embodiments of the present disclosure, as shown in FIG. 6A, the first gate line GA and the second gate line GB corresponding to the same row of sub-pixels spx may be respectively located on two sides of the row of sub-pixels spx. That is, one first gate line GA and one second gate line GB are arranged between adjacent two rows of sub-pixels, one second gate line GB is arranged on a side, facing away from the second row of sub-pixels, of the first row of sub-pixels, and one first gate line GA is arranged on a side, facing away from the last but one row of sub-pixels, of the last row of sub-pixels. Of course, the present disclosure includes, but is not limited to this, and may be designed and determined according to the actual application environment, which is not limited herein.

Figure 6B:
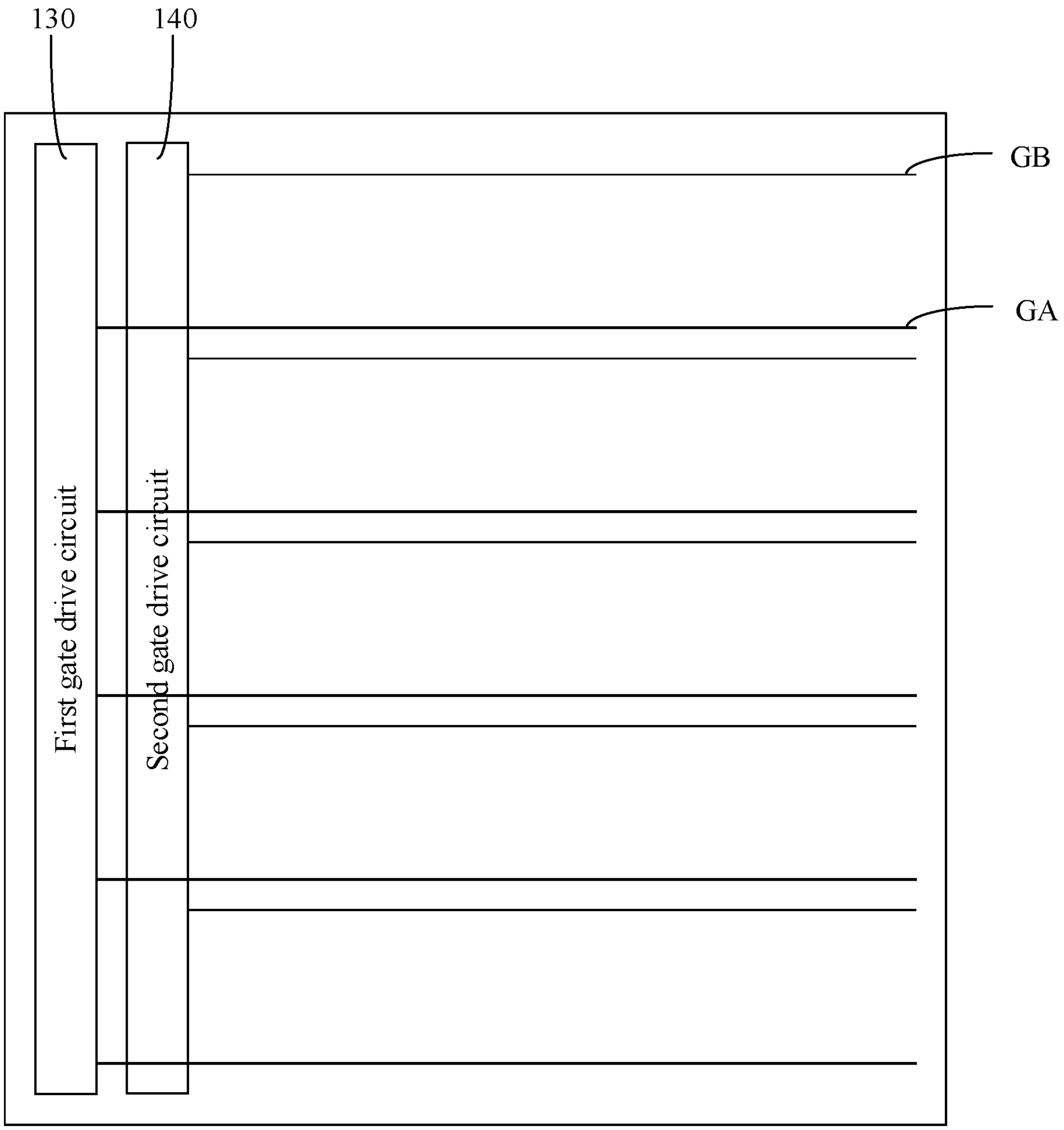
FIG. 6B is a schematic structural diagram of another display panel in an embodiment of the present disclosure.

In some embodiments of the present disclosure, as shown in FIG. 6B, the display panel may further include: a first gate drive circuit 130 and a second gate drive circuit 140. The first gate drive circuit 130 is electrically connected to each of the first gate lines GA. The second gate drive circuit 140 is electrically connected to each of the second gate lines GB. Thus, the first gate drive circuit 130 can load a corresponding signal to each of the first gate lines GA, and the second gate drive circuit 140 can load a corresponding signal to each of the second gate lines GB.

It should be noted that the first gate drive circuit may include a plurality of cascaded first shift registers, and one first shift register is electrically connected to one first gate line. Of course, in actual application, the structure and working process of the first gate drive circuit may be basically the same as those in the related art, and should be understood by those of ordinary skill in the art, and details will not be repeated herein.

It should be noted that the second gate drive circuit may include a plurality of cascaded second shift registers, and one second shift register is electrically connected to one second gate line. Of course, in actual application, the structure and working process of the second gate drive circuit may be basically the same as those in the related art, and should be understood by those of ordinary skill in the art, and details will not be repeated herein.

In some embodiments of the present disclosure, the above-mentioned display panel may be a liquid crystal display panel. For example, the liquid crystal display panel may include an array substrate and an opposite substrate arranged oppositely, and a liquid crystal layer encapsulated between the array substrate and the opposite substrate. The above-mentioned pixel circuit and pixel electrode may be arranged on a side, facing to the opposite substrate, of the array substrate. Thus, the liquid crystal display panel can realize multi-color-depth display. Besides, when the display panel adopts a lower refresh frequency (for example, 1 Hz, 15 Hz, 30 Hz), the advantage of reducing power consumption can be more obvious, and the core competitiveness of the product is further enhanced.

Based on the same inventive concept, an embodiment of the present disclosure further provides a driving method of a display panel, including: a first driving mode and a second driving mode. In the first driving mode, the display panel may be driven to use a first color depth for display. In the second driving mode, the display panel may be driven to use a second color depth for display.

Exemplarily, the first color depth can be made smaller than the second color depth. In specific implementation, each pixel cell PX may include a red sub-pixel, a green sub-pixel and a blue sub-pixel. For example, the first color depth may be set to 8 color, the second color depth may be set to 64 color, or the second color depth may also be set to $64^3$ color, or the second color depth may also be set to 2563 color. Of course, in actual application, different application environments have different requirements for display panels, so that specific values of the first color depth and the second color depth can be designed and determined according to the actual application environment, and are not limited herein.

Figure 7A:
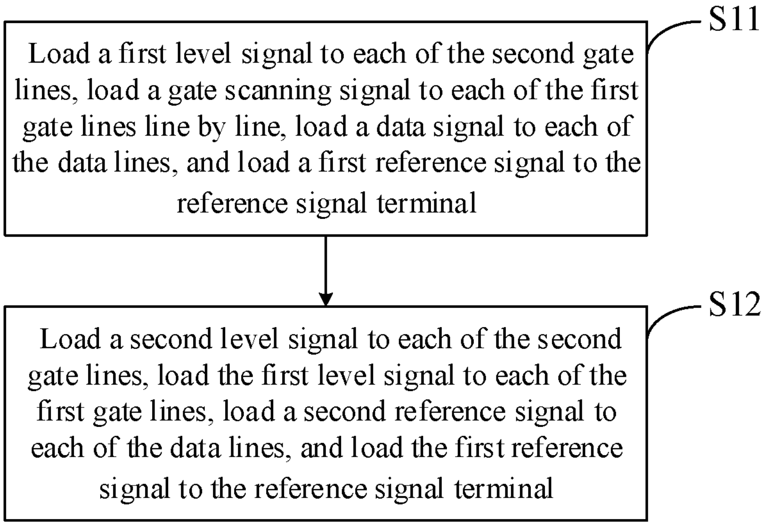
FIG. 7A is a flowchart of a driving method of a display panel in an embodiment of the present disclosure.

In some embodiments of the present disclosure, as shown in FIG. 7A, the driving the display panel to use the first color depth for display may include the following steps.

S11, loading a first level signal to each of the second gate lines GB, loading a gate scanning signal to each of the first gate lines GA line by line, loading a data signal to each of the data lines DA, and loading a first reference signal to the reference signal terminal VREF.

S12, loading a second level signal to each of the second gate lines GB, loading the first level signal to each of the first gate lines GA, loading a second reference signal to each of the data lines DA, and loading the first reference signal to the reference signal terminal VREF.

Exemplarily, the first level signal may be a low-level signal, and the second level signal may be a high-level signal. Of course, the first level signal may also be a high-level signal, and the second level signal may also be a low-level signal, which is not limited herein.

Taking the structures shown in FIG. 2B and FIG. 6A as an example, in conjunction with the circuit timing diagram shown in FIG. 7B, the working process of the display panel provided by some embodiments of the present disclosure will be described below.

The following takes red sub-pixels spx in the same column of pixel cells PX as an example and takes the first row of pixel cells PX to the third row of pixel cells PX as an example for description, wherein ga-GB1 represents the signal transmitted on the second gate line GB in the first row, ga-GB2 represents the signal transmitted on the second gate line GB in the second row, and ga-GB3 represents the signal transmitted on the second gate line GB in the third row; and ga-GA1 represents the a signal transmitted on the first gate line GA in the first row, ga-GA2 represents the a signal transmitted on the first gate line GA in the second row, and ga-GA3 represents the a signal transmitted on the first gate line GA in the third row.

Figure 7B:
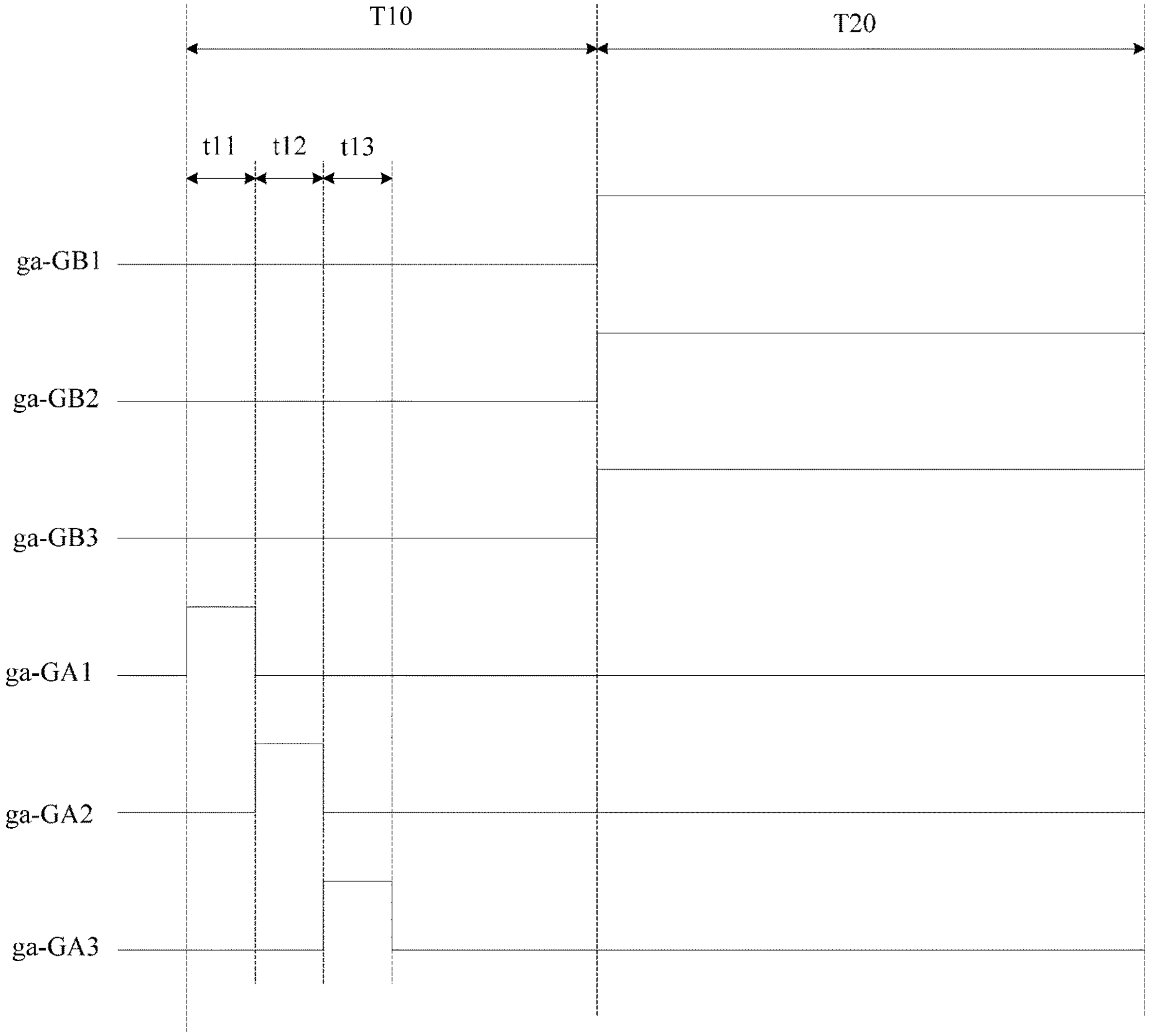
FIG. 7B is a circuit timing diagram of a display panel in an embodiment of the present disclosure.

As shown in FIG. 7B, one frame time has a T10 stage and a T20 stage. The working process of the step S11 can be realized in the T10 stage, and the working process of the step S12 can be realized in the T20 stage.

In the T10 stage, in a t1 stage, since the signals ga-GB1 to ga-GB3 are low-level signals, the first transistors M1 in the red sub-pixels spx of the first row to the third row are turned off. Since the signals ga-GA2 and ga-GA3 are both low-level signals, the second transistors M2 in the red sub-pixels spx of the second row and the red sub-pixels spx of the third row are turned off. Since ga-GA1 is a high-level signal, the second transistors M2 in red sub-pixels spx of the first row are turned on, so that the data signal transmitted on the data line DA is provided to the first node N1.

If the data signal is a high-level signal (for example, the signal of the data voltage corresponding to the highest gray level), the signal of the first node N1 is a high-level signal, and under the action of the third transistor M3 to the sixth transistor M6, the signal of the second node N2 may be a low-level signal, so that the seventh transistor M7 is turned on and the eighth transistor M8 is turned off. The turned-on seventh transistor M7 may provide the data voltage corresponding to the zero gray level of the reference signal terminal VREF to the pixel electrode 120, so that the data voltage corresponding to the zero gray level is input to the pixel electrode 120.

If the data signal is a low-level signal (for example, the signal of the data voltage corresponding to the zero gray level), the signal of the first node N1 is a low-level signal, and under the action of the third transistor M3 to the sixth transistor M6, the signal of the second node N2 may be a high-level signal, so that the seventh transistor M7 is turned off and the eighth transistor M8 is turned on. The turned-on eighth transistor M8 may connect the third node N3 with the pixel electrode 120. However, since the first transistor M1 is not turned on, the voltage on the data line is not input to the pixel electrode 120 in the red sub-pixel spx of the first row.

In a t2 stage, since the signals ga-GB1 to ga-GB3 are all low-level signals, the first transistors M1 in the red sub-pixels spx of the first row to the third row are turned off. Since the signals ga-GA1 and ga-GA3 are both low-level signals, the second transistors M2 in the red sub-pixels spx of the first row and the red sub-pixels spx of the third row are turned off. Since ga-GA2 is a high-level signal, the second transistors M2 in the red sub-pixels spx of the second row are turned on, so that the data signal transmitted on the data line DA is provided to the first node N1.

If the data signal is a high-level signal, the signal of the first node N1 is a high-level signal, and under the action of the third transistor M3 to the sixth transistor M6, the signal of the second node N2 may be a low-level signal, so that the seventh transistor M7 is turned on and the eighth transistor M8 is turned off. The turned-on seventh transistor M7 may provide the data voltage corresponding to the zero gray level of the reference signal terminal VREF to the pixel electrode 120, so that the data voltage corresponding to the zero gray level is input to the pixel electrode 120.

If the data signal is a low-level signal, the signal of the first node N1 is a low-level signal, and under the action of the third transistor M3 to the sixth transistor M6, the signal of the second node N2 may be a high-level signal, so that the seventh transistor M7 is turned off and the eighth transistor M8 is turned on. The turned-on eighth transistor M8 may connect the third node N3 with the pixel electrode 120. However, since the first transistor M1 is not turned on, the voltage is not input to the pixel electrode 120 in the red sub-pixel spx of the second row.

In a t3 stage, since the signals ga-GB1 to ga-GB3 are low-level signals, the first transistors M1 in the red sub-pixels spx of the first row to the third row are turned off. Since the signals ga-GA1 and ga-GA2 are both low-level signals, the second transistors M2 in the red sub-pixels spx of the first row and the red sub-pixels spx of the second row are turned off. Since ga-GA3 is a high-level signal, the second transistors M2 in the red sub-pixels spx of the third row are turned on, so that the data signal transmitted on the data line DA is provided to the first node N1.

If the data signal is a high-level signal, the signal of the first node N1 is a high-level signal, and under the action of the third transistor M3 to the sixth transistor M6, the signal of the second node N2 may be a low-level signal, so that the seventh transistor M7 is turned on and the eighth transistor M8 is turned off. The turned-on seventh transistor M7 may provide the data voltage corresponding to the zero gray level of the reference signal terminal VREF to the pixel electrode 120, so that the data voltage corresponding to the zero gray level is input to the pixel electrode 120.

If the data signal is a low-level signal, the signal of the first node N1 is a low-level signal, and under the action of the third transistor M3 to the sixth transistor M6, the signal of the second node N2 may be a high-level signal, so that the seventh transistor M7 is turned off and the eighth transistor M8 is turned on. The turned-on eighth transistor M8 may connect the third node N3 with the pixel electrode 120. However, since the first transistor M1 is not turned on, the voltage is not input to the pixel electrode 120 in the red sub-pixel spx of the third row.

The working process of the rest rows of sub-pixels spx may be deduced by analogy, and will not be repeated herein.

In the T20 stage, since the signals ga-GA1 to ga-GA3 are low-level signals, the second transistors M2 in the red sub-pixels spx of the first row to the red sub-pixels spx of the third row are turned off. Therefore, in each of the sub-pixels spx, the signals of the first node N1 and the second node N2 are latched by the latch composed of the third transistor M3 to the sixth transistor M6. Since the signals ga-GB1 to ga-GB3 are high-level signals, the first transistors M1 in the red sub-pixels spx of the first row to the third row are turned on. Besides, the data voltage corresponding to the highest gray level is loaded to each of the data lines DA.

If the data signal in the t1 stage is a high-level signal, the data voltage corresponding to the zero gray level is input to the pixel electrode 120 in the red sub-pixel spx of the first row, and a voltage difference ΔV1 between the pixel electrode and a common electrode is: $\Delta V1 = Vp - Vcom$. Vp represents the data voltage corresponding to zero gray level, and Vcom represents the voltage on the common electrode. Since the voltages Vp and Vcom are the same, $\Delta V1 = 0$. Then, the red in the pixel cells PX of the first row is used as the zero gray level. If the data signal in the t1 stage is a low-level signal, the eighth transistor M8 and the first transistor M1 in the red sub-pixels spx of the first row are turned on, so that the data voltage corresponding to the highest gray level transmitted on the data line DA may be provided to the pixel electrode 120, and a voltage difference ΔV2 between the pixel electrode and the common electrode is: $\Delta V2=Vq-Vcom$. Vq represents the data voltage corresponding to the highest gray level, and Vcom represents the voltage on the common electrode. Since the voltages Vq and Vcom are different, $\Delta V2\neq 0$, and liquid crystal molecules are deflected. Then, the red in the pixel cells PX of the first row is used as the brightest gray level. Therefore, the red in the pixel cells PX of the first row may realize the brightness of two gray levels. Similarly, in the pixel cell PX of the first row, the green and blue may also realize the brightness of two gray levels respectively. Thus, one pixel cell PX of the first row may display colors of 8 gray levels.

If the data signal in the t2 stage is a high-level signal, the data voltage corresponding to the zero gray level is input to the pixel electrode 120 in the red sub-pixel spx of the second row, and a voltage difference ΔV1 between the pixel electrode and the common electrode is: $\Delta V1=Vp-Vcom$. Vp represents the data voltage corresponding to the zero gray level, and Vcom represents the voltage on the common electrode. Since the voltages Vp and Vcom are the same, $\Delta V1=0$. Then, the red in the pixel cells PX of the second row is used as the zero gray level. If the data signal in the t2 stage is a low-level signal, the eighth transistor M8 and the first transistor M1 in the red sub-pixels spx of the second row are turned on, so that the data voltage corresponding to the highest gray level transmitted on the data line DA may be provided to the pixel electrode 120, and a voltage difference ΔV2 between the pixel electrode and the common electrode is: $\Delta V2=Vq-Vcom$. Vq represents the data voltage corresponding to the highest gray level, and Vcom represents the voltage on the common electrode. Since the voltages Vq and Vcom are different, $\Delta V2\neq 0$, and the liquid crystal molecules are deflected. Then, the red in the pixel cells PX of the second row is used as the brightest gray level. Therefore, the red in the pixel cells PX of the second row may realize the brightness of two gray levels. Similarly, in the pixel cells PX of the second row, the green and blue may also realize the brightness of two gray levels respectively. Thus, one pixel cell PX of the second row may display colors of 8 gray levels.

Similarly, one pixel cell PX of the third row may display colors of 8 gray levels.

In summary, through the above-mentioned driving process, each pixel cell PX in the display panel may display colors of 8 gray levels, so that the first color depth of the display panel is 8 color.

Moreover, in an embodiment of the present disclosure, when the data voltage corresponding to the zero gray level is input to the pixel electrode, a current flow path may be: reference signal terminal VREF-seventh transistor M7-pixel electrode 120. Thus, compared with the current flow path for charging the pixel electrode 01: signal line FRP-transistor M07-transistor M02-pixel electrode 01, the current flow path has the feature that the power consumption of at least one transistor can be saved. Especially, when the display panel adopts a lower refresh frequency (for example, 1 Hz, 15 Hz, 30 Hz), the advantage of reducing power consumption is more obvious, and the core competitiveness of the product is enhanced.

Figure 8A:
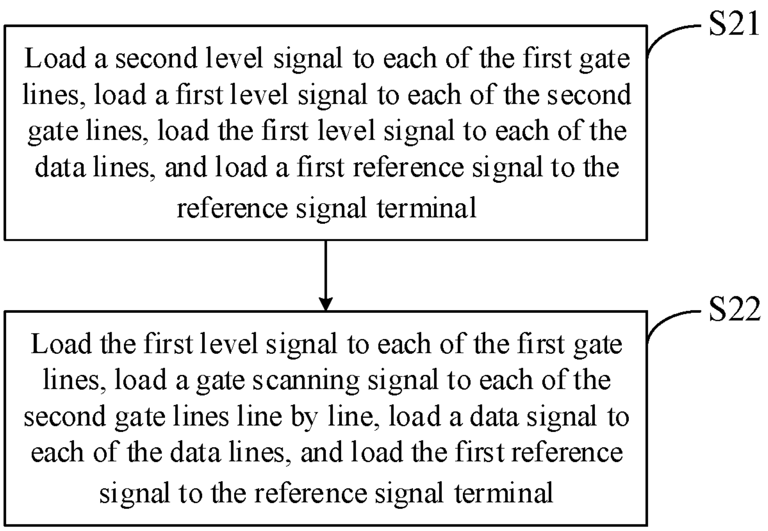
FIG. 8A is a flowchart of a driving method of another display panel in an embodiment of the present disclosure.

In some embodiments of the present disclosure, as shown in FIG. 8A, the driving the display panel to use the second color depth for display may include the following steps.

S21, loading a second level signal to each of the first gate lines GA, loading a first level signal to each of the second gate lines GB, loading the first level signal to each of the data lines DA, and loading a first reference signal to the reference signal terminal VREF.

S22, loading the first level signal to each of the first gate lines GA, loading the gate scanning signal to each of the second gate lines GB line by line, loading a data signal to each of the data lines DA, and loading the first reference signal to the reference signal terminal VREF.

Exemplarily, the first level signal may be a low-level signal, and the second level signal may be a high-level signal. Of course, the first level signal may also be a high-level signal, and the second level signal may also be a low-level signal, which is not limited herein.

Taking the structures shown in FIG. 2B and FIG. 6A as an example, in conjunction with a circuit timing diagram shown in FIG. 8B, the working process of the display panel provided by the embodiment of the present disclosure will be described below.

The following takes the red sub-pixels spx in the same column of pixel cells PX as an example and takes the first row of pixel cells PX to the third row of pixel cells PX as an example for description, wherein ga-GB1 represents a signal transmitted on the second gate line GB in the first row, ga-GB2 represents a signal transmitted on the second gate line GB in the second row, and ga-GB3 represents a signal transmitted on the second gate line GB in the third row; and ga-GA1 represents a signal transmitted on the first gate line GA in the first row, ga-GA2 represents a signal transmitted on the first gate line GA in the second row, and ga-GA3 represents a signal transmitted on the first gate line GA in the third row.

Figure 8B:
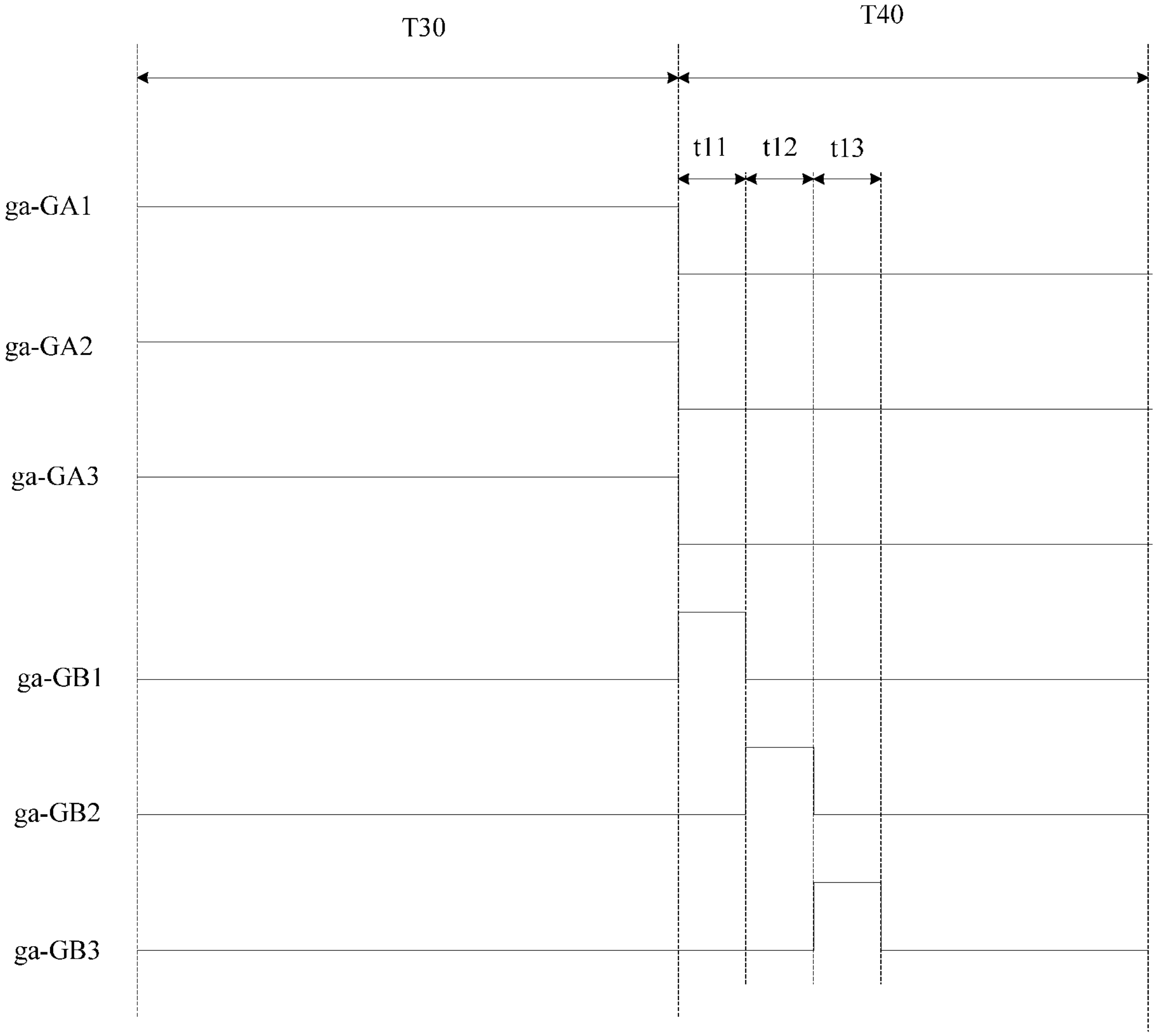
FIG. 8B is a circuit timing diagram of another display panel in an embodiment of the present disclosure.

As shown in FIG. 8B, one frame time has a T30 stage and a T40 stage. The working process of the step S21 can be realized in the T30 stage, and the working process of the step S22 can be realized in the T40 stage.

In the T30 stage, since the signals ga-GB1 to ga-GB3 are low-level signals, the first transistors M1 in the red sub-pixels spx of the first row to the third row are turned off. Since the signals ga-GA1 to ga-GA3 are high-level signals, the second transistors M2 in the red sub-pixels spx of the first row to the third row are turned on. A low-level signal is loaded to each of the data lines DA, and then input to the first node N1 through the turned-on second transistors M2 in the red sub-pixels spx of the first row to the third row, so that the signal of the first node N1 is a low-level signal. Under the action of the third transistor M3 to the sixth transistor M6, the signal of the second node N2 may be a high-level signal, so that the seventh transistor M7 is turned off and the eighth transistor M8 is turned on. The turned-on eighth transistor M8 may connect the third node N3 with the pixel electrode 120. However, since the first transistor M1 is not turned on, the voltage on the data line is not input to the pixel electrode 120 in the red sub-pixels spx of the first row to the third row. Similarly, the voltage on the data line is not input to the pixel electrode 120 in the rest sub-pixels spx.

In the T40 stage, in a t1 stage, since the signals ga-GA1 to ga-GA3 are low-level signals, the second transistors M2 in the red sub-pixels spx of the first row to the third row are turned off. Since the signals ga-GB2 and ga-GB3 are both low-level signals, the first transistors M1 in the red sub-pixels spx of the second row and the red sub-pixels spx of the third row are turned off. Since ga-GB1 is a high-level signal, the first transistors M1 in the red sub-pixels spx of the first row are turned on, so that the data signal transmitted on the data lines DA is provided to the third node N3. Under the action of the third transistor M3 to the sixth transistor M6, the eighth transistor M8 is also turned on, so that the data signal transmitted on the data lines DA may be provided to the pixel electrode 120. If the voltage of the data signal can correspond to a data voltage corresponding to a gray level 64, the red sub-pixels spx of the first row can realize the brightness of 64 gray levels. Similarly, in the pixel cells PX of the first row, the green and blue may also realize the brightness of 64 gray levels respectively. Thus, one pixel cell PX of the first row may display colors of $64^3$ gray levels.

In a t2 stage, since the signals ga-GA1 to ga-GA3 are low-level signals, the second transistors M2 in the red sub-pixels spx of the first row to the third row are turned off. Since the signals ga-GB1 and ga-GB3 are low-level signals, the first transistors M1 in the red sub-pixels spx of the first row and the red sub-pixels spx of the third row are turned off. Since ga-GB2 is a high-level signal, the first transistors M1 in the red sub-pixels spx of the second row are turned on, so that the data signal transmitted on the data lines DA is provided to the third node N3. Under the action of the third transistor M3 to the sixth transistor M6, the eighth transistor M8 is also turned on, so that the data signal transmitted on the data lines DA may be provided to the pixel electrode 120. If the voltage of the data signal can correspond to the data voltage of the gray level 64, the red sub-pixels spx of the second row can realize the brightness of 64 gray levels. Similarly, in the pixel cells PX of the second row, the green and blue may also realize the brightness of 64 gray levels respectively. Thus, one pixel cell PX of the second row may display colors of $64^3$ gray levels.

In a t3 stage, since the signals ga-GA1 to ga-GA3 are low-level signals, the second transistors M2 in the red sub-pixels spx of the first row to the third row are turned off. Since the signals ga-GB1 and ga-GB2 are both low-level signals, the first transistors M1 in the red sub-pixels spx of the first row and the red sub-pixels spx of the second row are turned off. Since ga-GB3 is a high-level signal, the first transistors M1 in the red sub-pixels spx of the third row are turned on, so that the data signal transmitted on the data lines DA is provided to the third node N3. Under the action of the third transistor M3 to the sixth transistor M6, the eighth transistor M8 is also turned on, so that the data signal transmitted on the data lines DA may be provided to the pixel electrode 120. If the voltage of the data signal can correspond to the data voltage of the gray level 64, then the red sub-pixels spx of the third row can realize the brightness of 64 gray levels. Similarly, in the pixel cells PX of the third row, the green and blue may also realize the brightness of 64 gray levels respectively. Thus, one pixel cell PX of the third row may display colors of $64^3$ gray levels.

In summary, through the above-mentioned driving process, each pixel cell PX in the display panel may display colors of $64^3$ gray levels, so that the first color depth of the display panel is $64^3$ color.

Based on the same inventive concept, an embodiment of the present disclosure further provides a display device, including the above-mentioned display panel provided by some embodiments of the present disclosure. The principle of the display device to solve the problems is similar to that of the aforementioned display panel. Therefore, for the implementation of the display device, reference may be made to the implementation of the aforementioned display panel, and the repetition is not described herein.

In some embodiments of the present disclosure, the display device may be: any product or component with a display function, such as a mobile phone, a tablet computer, a television, a display, a notebook computer, a digital photo frame, a navigator or the like. Other essential components of the display device should be understood by those of ordinary skill in the art, which will not be repeated herein and should not be taken as a limitation to the present disclosure.

The present disclosure provides a pixel circuit, a display panel, a display device and a driving method. The pixel circuit includes: a first control module, a latch module, a second control module, a first input module and a second input module. The first control module is configured to provide a signal on a corresponding data line to a first node under the control of a signal on a corresponding first gate line. The latch module is configured to latch signals of the first node and a second node. The second control module is configured to provide the signal on the data line to a third node under the control of a signal on a corresponding second gate line. The first input module is configured to provide a signal of a reference signal terminal to a pixel electrode under the control of the signal of the first node. The second input module is configured to provide a signal of the third node to the pixel electrode under the control of the signal of the second node. Thus, through the mutual cooperation of the first control module, the latch module, the second control module, the first input module and the second input module, the power consumption of the flow path for charging the pixel electrode can be reduced. Especially, when a lower refresh frequency (for example, 1 Hz) is adopted, the advantage of reducing power consumption is more obvious, and the core competitiveness of the product is enhanced.

It will be apparent that those skilled in the art can make various modifications and variations to the present disclosure without departing from the spirit and scope of the present disclosure. Thus, if such modifications and variations of the present disclosure fall within the scope of the claims of the present disclosure and the equivalent technologies thereof, the present disclosure is also intended to cover such modifications and variations.

What is claimed is:

1. A pixel circuit, comprising: a first control circuit, a latch circuit, a second control circuit, a first input circuit and a second input circuit; wherein the first control circuit is configured to provide a signal on a data line to a first node under a control of a signal on a first gate line;

the latch circuit is configured to latch signals of the first node and a second node;

the second control circuit is configured to provide the signal on the data line to a third node under a control of a signal on a second gate line;

the first input circuit is configured to provide a signal of a reference signal terminal to a pixel electrode under a control of the signal of the first node; and the second input circuit is configured to provide a signal of the third node to the pixel electrode under a control of the signal of the second node, the third node connecting the second control circuit and the second input circuit;

wherein a first terminal of the first control circuit is directly connected to the data line, a second terminal of the first control circuit is connected to the first gate line, and a third terminal of the first control circuit is connected to the first node;

a first terminal of the second control circuit is directly connected to a first terminal of the second input circuit, a second terminal of the second control circuit is connected to the second gate line, and a third terminal of the second control circuit is connected to the data line;

a first terminal of the first input circuit is connected to a third terminal of the second input circuit, a second terminal of the first input circuit is connected to the first node, and a third terminal of the first input circuit is connected to the reference signal terminal;

a second terminal of the second input circuit is connected to the second node; and the first terminal of the first input circuit and the third terminal of the second input circuit are both connected to the pixel electrode.

2. The pixel circuit according to claim 1, wherein a control terminal of the second control circuit is electrically connected to the second gate line, an input terminal of the second control circuit is electrically connected to the data line, and an output terminal of the second control circuit is electrically connected to the third node.

3. The pixel circuit according to claim 2, wherein the second control circuit comprises: a first transistor, wherein a gate of the first transistor is electrically connected to the second gate line, a first electrode of the first transistor is electrically connected to the data line, and a second electrode of the first transistor is electrically connected to the third node.

4. The pixel circuit according to claim 1, wherein the first input circuit comprises a seventh transistor, a gate of the seventh transistor is electrically connected to the first node, a first electrode of the seventh transistor is electrically connected to the reference signal terminal, and a second electrode of the seventh transistor is electrically connected to the pixel electrode; and the second input circuit comprises: an eighth transistor, a gate of the eighth transistor is electrically connected to the second node, a first electrode of the eighth transistor is electrically connected to the third node, and a second electrode of the eighth transistor is electrically connected to the pixel electrode.

5. The pixel circuit according to claim 1, wherein the first control circuit comprises: a second transistor, a gate of the second transistor is electrically connected to the first gate line, a first electrode of the second transistor is electrically connected to the data line, and a second electrode of the second transistor is electrically connected to the first node;

the latch circuit comprises: a third transistor, a fourth transistor, a fifth transistor and a sixth transistor;

a gate of the third transistor is electrically connected to the first node, a first electrode of the third transistor is electrically connected to a first voltage terminal, and a second electrode of the third transistor is electrically connected to the second node;

a gate of the fourth transistor is electrically connected to the first node, a first electrode of the fourth transistor is electrically connected to a second voltage terminal, and a second electrode of the fourth transistor is electrically connected to the second node;

a gate of the fifth transistor is electrically connected to the second node, a first electrode of the fifth transistor is electrically connected to the first voltage terminal, and a second electrode of the fifth transistor is electrically connected to the first node; and a gate of the sixth transistor is electrically connected to the second node, a first electrode of the sixth transistor is electrically connected to the second voltage terminal, and a second electrode of the sixth transistor is electrically connected to the first node.

6. A method for driving the pixel circuit according to claim 1, comprising: a first driving mode and a second driving mode;

in the first driving mode, loading a first level signal to the second gate line, loading a gate scanning signal to the first gate line, loading a data signal to the data line, and loading a first reference signal to the reference signal terminal, and loading a second level signal to the second gate line, loading the first level signal to the first gate line, loading a second reference signal to the data line, and loading the first reference signal to the reference signal terminal; and in the second driving mode, loading the second level signal to the first gate line, loading the first level signal to the second gate line, loading the first level signal to the data line, and loading the first reference signal to the reference signal terminal, and loading the first level signal to the first gate line, loading the gate scanning signal to the second gate line, loading the data signal to the data line, and loading the first reference signal to the reference signal terminal.

7. A display panel, comprising: a plurality of first gate lines, a plurality of second gate lines, a plurality of data lines and a plurality of pixel cells arranged in an array; wherein each of the plurality of pixel cells comprises a plurality of sub-pixels, and each of the plurality of sub-pixels comprises a pixel circuit and a pixel electrode, one row of the plurality of sub-pixels correspond to one of the plurality of first gate lines and one of the plurality of second gate lines, and one column of the plurality of sub-pixels correspond to one of the plurality of data lines;

wherein the pixel circuit comprises a first control circuit, a latch circuit, a second control circuit, a first input circuit and a second input circuit; wherein the first control circuit is configured to provide a signal on a data line to a first node under a control of a signal on a first gate line;

the latch circuit is configured to latch signals of the first node and a second node;

the second control circuit is configured to provide the signal on the data line to a third node under a control of a signal on a second gate line;

the first input circuit is configured to provide a signal of a reference signal terminal to a pixel electrode under a control of the signal of the first node; and the second input circuit is configured to provide a signal of the third node to the pixel electrode under a control of the signal of the second node, the third node connecting the second control circuit and the second input circuit;

wherein a first terminal of the first control circuit is directly connected to the data line, a second terminal of the first control circuit is connected to the first gate line, and a third terminal of the first control circuit is connected to the first node;

a first terminal of the second control circuit is directly connected to a first terminal of the second input circuit, a second terminal of the second control circuit is connected to the second gate line, and a third terminal of the second control circuit is connected to the data line:

a first terminal of the first input circuit is connected to a third terminal of the second input circuit, a second terminal of the first input circuit is connected to the first node, and a third terminal of the first input circuit is connected to the reference signal terminal;

a second terminal of the second input circuit is connected to the second node; and the first terminal of the first input circuit and the third terminal of the second input circuit are both connected to the pixel electrode.

8. The display panel according to claim 7, further comprises: a first gate drive circuit and a second gate drive circuit;

the first gate drive circuit is electrically connected to the plurality of first gate lines; and the second gate drive circuit is electrically connected to the plurality of second gate lines.

9. A display device, comprising the display panel of claim 7.

10. A method for driving the display panel of claim 7, comprising:

in a first driving mode, driving the display panel to use a first color depth for display; and in a second driving mode, driving the display panel to use a second color depth for display; wherein the driving the display panel to use the first color depth for display comprises:

loading a first level signal to each of the second gate lines, loading a gate scanning signal to the first gate lines line by line, loading a data signal to each of the data lines, and loading a first reference signal to the reference signal terminal, and loading a second level signal to the second gate lines, loading the first level signal to the first gate lines, loading a second reference signal to the data lines, and loading the first reference signal to the reference signal terminal; and the driving the display panel to use the second color depth for display comprises:

loading the second level signal to the first gate lines, loading the first level signal to the second gate lines, loading the first level signal to the data lines, and loading the first reference signal to the reference signal terminal, and loading the first level signal to the first gate lines, loading the gate scanning signal to the second gate lines line by line, loading the data signal to the data lines, and loading the first reference signal to the reference signal terminal.

11. The driving method according to claim 10, wherein a voltage of the first reference signal is a data voltage corresponding to a zero gray level, and a voltage of the second reference signal is a data voltage corresponding to a highest gray level.

12. The display panel according to claim 7, wherein a control terminal of the second control circuit is electrically connected to the second gate line, an input terminal of the second control circuit is electrically connected to the data line, and an output terminal of the second control circuit is electrically connected to the third node.

13. The display panel according to claim 12, wherein the second control circuit comprises: a first transistor, wherein a gate of the first transistor is electrically connected to the second gate line, a first electrode of the first transistor is electrically connected to the data line, and a second electrode of the first transistor is electrically connected to the third node.

14. The display panel according to claim 7, wherein the first input circuit comprises a seventh transistor, a gate of the seventh transistor is electrically connected to the first node, a first electrode of the seventh transistor is electrically connected to the reference signal terminal, and a second electrode of the seventh transistor is electrically connected to the pixel electrode; and the second input circuit comprises: an eighth transistor, a gate of the eighth transistor is electrically connected to the second node, a first electrode of the eighth transistor is electrically connected to the third node, and a second electrode of the eighth transistor is electrically connected to the pixel electrode.

15. The display panel according to claim 7, wherein the first control circuit comprises: a second transistor, a gate of the second transistor is electrically connected to the first gate line, a first electrode of the second transistor is electrically connected to the data line, and a second electrode of the second transistor is electrically connected to the first node;

the latch circuit comprises: a third transistor, a fourth transistor, a fifth transistor and a sixth transistor;

a gate of the third transistor is electrically connected to the first node, a first electrode of the third transistor is electrically connected to a first voltage terminal, and a second electrode of the third transistor is electrically connected to the second node;

a gate of the fourth transistor is electrically connected to the first node, a first electrode of the fourth transistor is electrically connected to a second voltage terminal, and a second electrode of the fourth transistor is electrically connected to the second node;

a gate of the fifth transistor is electrically connected to the second node, a first electrode of the fifth transistor is electrically connected to the first voltage terminal, and a second electrode of the fifth transistor is electrically connected to the first node; and a gate of the sixth transistor is electrically connected to the second node, a first electrode of the sixth transistor is electrically connected to the second voltage terminal, and a second electrode of the sixth transistor is electrically connected to the first node.

* * * * *